United States Patent
Yang et al.

(10) Patent No.: US 9,996,138 B2
(45) Date of Patent: Jun. 12, 2018

(54) ELECTRONIC SYSTEM AND RELATED CLOCK MANAGING METHOD

(71) Applicant: MEDIATEK INC., Hsin-Chu (TW)

(72) Inventors: Ying-Ting Yang, New Taipei (TW); Chiuan-Shian Chen, Tainan (TW)

(73) Assignee: MEDIATEK INC., Hsin-Chu (TW)

( * ) Notice: Subject to any disclaimer, the term of this patent is extended or adjusted under 35 U.S.C. 154(b) by 0 days. days.

(21) Appl. No.: 14/973,748

(22) Filed: Dec. 18, 2015

(65) Prior Publication Data
US 2017/0068295 A1    Mar. 9, 2017

Related U.S. Application Data

(63) Continuation-in-part of application No. 14/846,560, filed on Sep. 4, 2015.

(51) Int. Cl.
| | |
|---|---|
| G06F 1/00 | (2006.01) |
| G06F 1/24 | (2006.01) |
| G06F 1/12 | (2006.01) |
| G06F 1/32 | (2006.01) |
| G06F 1/06 | (2006.01) |
| G06F 1/26 | (2006.01) |
| G06F 1/08 | (2006.01) |

(52) U.S. Cl.
CPC .............. *G06F 1/324* (2013.01); *G06F 1/06* (2013.01); *G06F 1/26* (2013.01); *G06F 1/3206* (2013.01); *G06F 1/3296* (2013.01); *G06F 1/08* (2013.01); *Y02D 10/172* (2018.01)

(58) Field of Classification Search
CPC .................................... G06F 1/32; G06F 1/26
See application file for complete search history.

(56) References Cited

U.S. PATENT DOCUMENTS

| | | | | |
|---|---|---|---|---|
| 6,265,916 B1* | 7/2001 | Ono | ............. | H03L 7/0802 327/116 |
| 6,618,462 B1* | 9/2003 | Ross | ............. | G06F 7/68 327/115 |
| 7,433,263 B2* | 10/2008 | Kim | ............. | G11C 7/1075 365/230.05 |
| 7,639,561 B2* | 12/2009 | Lee | ............. | G06F 13/4054 365/233.1 |

(Continued)

FOREIGN PATENT DOCUMENTS

| | | |
|---|---|---|
| EP | 2 592 754 A1 | 5/2013 |
| EP | 2 759 907 A1 | 7/2014 |

(Continued)

OTHER PUBLICATIONS

Boris Bobrov et al., "i.MX31 and i.MX31L Power Management", Freescale Semiconductor White Paper, Document No. IMX31POWERWP, Dec. 1, 2006, p. 1-12, XP55324622, Freescale Semiconductor, Inc.

(Continued)

*Primary Examiner* — Phil Nguyen
(74) *Attorney, Agent, or Firm* — Winston Hsu (57) ABSTRACT

An electronic system includes a plurality of function modules, each of the plurality of function modules operates according to one of a plurality of clock signals; and a clock management module, for generating the plurality of clock signals according to a plurality of performances requirements of the plurality of function modules.

11 Claims, 11 Drawing Sheets

(56) References Cited

U.S. PATENT DOCUMENTS

| | | | |
|---|---|---|---|
| 7,689,821 B2* | 3/2010 | Bailey | G06F 13/4068 |
| | | | 713/1 |
| 8,775,856 B1* | 7/2014 | An | G06F 1/06 |
| | | | 713/400 |
| 8,949,646 B1 | 2/2015 | Weber | |
| 2003/0126478 A1 | 7/2003 | Burns | |
| 2004/0098430 A1* | 5/2004 | Linkewitsch | G06F 1/025 |
| | | | 708/270 |
| 2005/0144497 A1* | 6/2005 | Song | G06F 1/10 |
| | | | 713/503 |
| 2006/0119551 A1 | 6/2006 | Chaussy | |
| 2008/0074205 A1* | 3/2008 | Chen | G06F 1/08 |
| | | | 331/74 |
| 2009/0204835 A1 | 8/2009 | Smith | |
| 2009/0222685 A1* | 9/2009 | Foster | G06F 1/14 |
| | | | 713/500 |
| 2010/0275037 A1* | 10/2010 | Lee | G06F 13/385 |
| | | | 713/189 |
| 2011/0078482 A1* | 3/2011 | Zhao | H04L 7/0054 |
| | | | 713/400 |
| 2011/0138195 A1 | 6/2011 | Kim | |
| 2013/0007413 A1* | 1/2013 | Thomson | G06F 1/324 |
| | | | 712/30 |
| 2013/0054866 A1* | 2/2013 | Saito | G06F 1/266 |
| | | | 710/313 |
| 2014/0237276 A1 | 8/2014 | Machnicki | |
| 2015/0106649 A1 | 4/2015 | Kannan | |
| 2016/0259391 A1* | 9/2016 | Tidwell | G06F 1/324 |

FOREIGN PATENT DOCUMENTS

| | | |
|---|---|---|
| JP | H11353052 A | 12/1999 |
| JP | 2004295450 A | 10/2004 |
| JP | 200550030 A | 2/2005 |
| JP | 2005122374 A | 5/2005 |
| JP | 201139836 A | 2/2011 |
| JP | 2012141730 A | 7/2012 |
| JP | 2012234315 A | 11/2012 |
| JP | 2014146095 A | 8/2014 |

OTHER PUBLICATIONS

Ji-Hoon Lim et al., "A Novel High-Speed and Low-Voltage CMOS Level-Up/Down Shifter Design for Multiple-Power and Multiple-Clock Domain Chips", IEICE Trans. Electron., vol. E90-C. No. 3, Mar. 2007, p. 644-648, XP001541508, 2007 The Institute of Electronics, Information and Communication Engineers.

Efraim Rotem et al., Multiple clock and Voltage Domains for Chip Multi Processors, Microarchitecture, New York, USA, Dec. 12, 2009, p. 459-468, XP031597289.

* cited by examiner

ELECTRONIC SYSTEM AND RELATED CLOCK MANAGING METHOD

CROSS REFERENCE TO RELATED APPLICATION

This application claims is a continuation-in-part application of application Ser. No. 14/846,560.

BACKGROUND

The present disclosure relates to an electronic system and related clock managing method, and more particularly, to an electronic system capable of adjusting clock signals of a plurality of function modules according to performance requirements of the plurality of function modules and related clock managing method.

Complementary Metal Oxide Semiconductor (CMOS) technology forms the basis of modern computing systems in electronic products, such as smart phones and tablets. Because of the high power consumption of smart phones and tablets, modern CMOS technology employs aggressive clock gating to preserve battery life. Generally, the clock frequency is designed according to the maximum performance of the specifications required by the computing system. When some components in the computing system are idle, however, the clock frequency designed according to the maximum performance may become a waste. Thus, how to balance the performances and the power consumption of the computing system for electronic products becomes a topic to be discussed.

SUMMARY

In order to solve the above mentioned problem, the present disclosure provides an electronic system capable of adjusting a clock signal of a plurality of function modules according to performances of the plurality of function modules and related clock managing method.

The present disclosure discloses an electronic system. The electronic system comprises a plurality of function modules, each of the plurality of function modules operates according to one of a plurality of clock signals; and a clock management module, for generating the plurality of clock signals according to a plurality of performances requirements of the plurality of function modules.

The present disclosure further discloses a clock managing method. The clock managing method comprises determining a plurality of performances requirements of a plurality of function modules; and adjusting a plurality of clock signals of the plurality of function modules according to the plurality of performance requirements.

These and other objectives of the present disclosure will no doubt become obvious to those of ordinary skill in the art after reading the following detailed description of the preferred implementation that is illustrated in the various figures and drawings.

DETAILED DESCRIPTION

Figure 1:
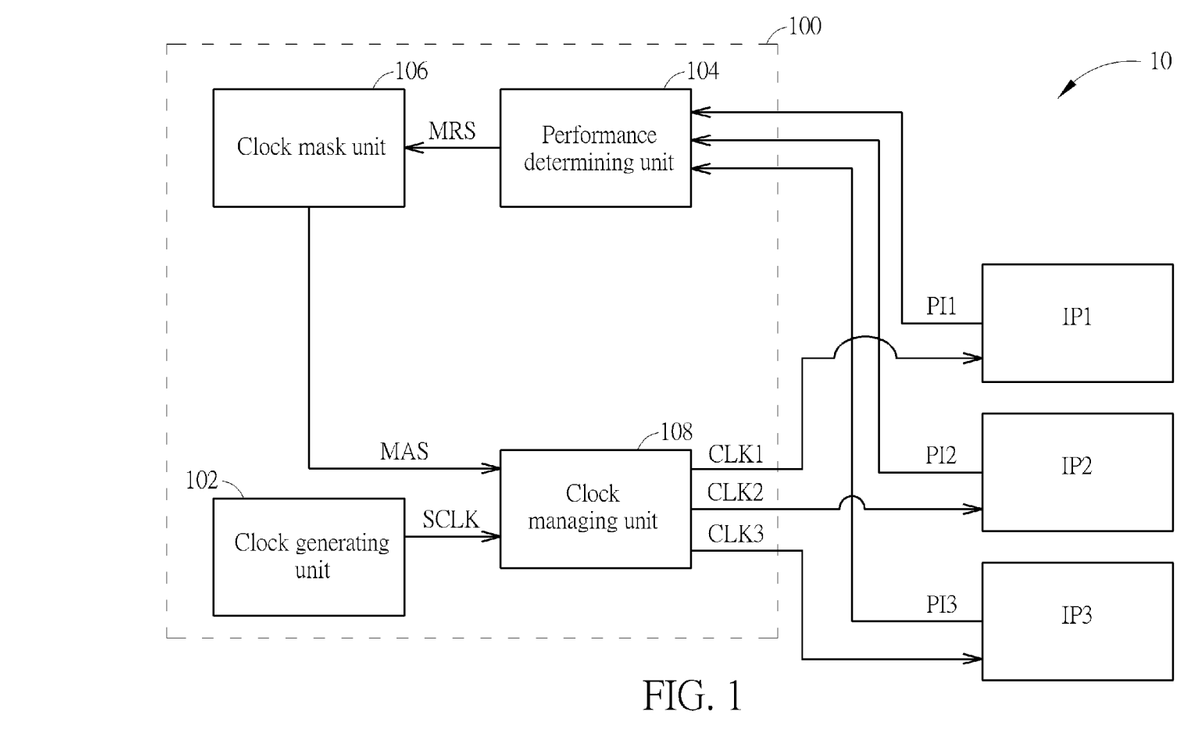
FIG. 1 is a schematic diagram of an electronic system according to an example of the present disclosure.

Please refer to FIG. 1, which is a schematic diagram of an electronic system 10 according to an example of the present disclosure. The electronic system 10 may be an electronic product such as a smart phone, a notebook computer, a tablet, or a smart television, and is not limited herein. As shown in FIG. 1, the electronic system 10 comprises function modules IP1-IP3 and a clock management module 100. The function modules IP1-IP3 may be Intellectual Property (IP) blocks utilized for providing independent functions. For example, the function modules IP1-IP3 may be Universal Serial Bus (USB) interface modules, wireless network interface modules, or input/output control modules, and is not limited herein. Note that, the number of function modules in the electronic system 10 may be varied according to different applications and design concepts. The function modules IP1-IP3 performs operations according to clock signals CLK1-CLK3 respectively, to provide independent functions, wherein performances P1-P3 of each of the function modules IP1-IP3 are respectively proportional to frequencies FCLK1-FCLK3 of the clock signals CLK1-CLK3. In an example, the performances P1-P3 may be considered as the amount of data inputted and outputted by the function modules IP1-IP3 (e.g. bandwidths or throughputs), which is not limited herein. In this example, the clock management module 100 determines the performances P1-P3 requirements of the function modules IP1-IP3 and accordingly adjusts the frequencies FCLK1-FLCK3 of the clock signals CLK1-CLK3, to reduce the power consumption of the electronic system 10.

In details, the clock management module 100 comprises a clock generating unit 102, a performance determining unit 104, a clock mask unit 106, and a clock managing unit 108. The clock generating unit 102 is a frequency synthesizing circuit (e.g. a phase-locked-loop (PLL) circuit) and is utilized for generating a source clock signal SCLK to the clock managing unit 108. The performance determining unit 104 determines the performances P1-P3 requirements of the function modules IP1-IP3 according to performance information signals PI1-PI3 generated by the function modules IP1-IP3 and accordingly determines mask ratios MR1-MR3 of generating the clock signals CLK1-CLK3, wherein the mask ratios MR1-MR3 can be inverse proportional to the performances P1-P3, respectively. The clock mask unit 106 generates a mask signal MAS according to the mask ratios MR1-MR3 indicated by a mask ration signal MRS from the performance determining unit 104, to instruct the clock managing unit 108 to adjust the clock signals CLK1-CL3. For example, the clock managing unit 108 may mask some of clock pulses of the clock signals CLK1-CLK3 according to the mask ratios MR1-MR3, respectively. That is, the frequency FCLK1-FCLK3 of the clock signals CLK1-CLK3 is adjusted according to the performances P1-P3 requirements of the function modules IP1-IP3, respectively.

Figure 2:
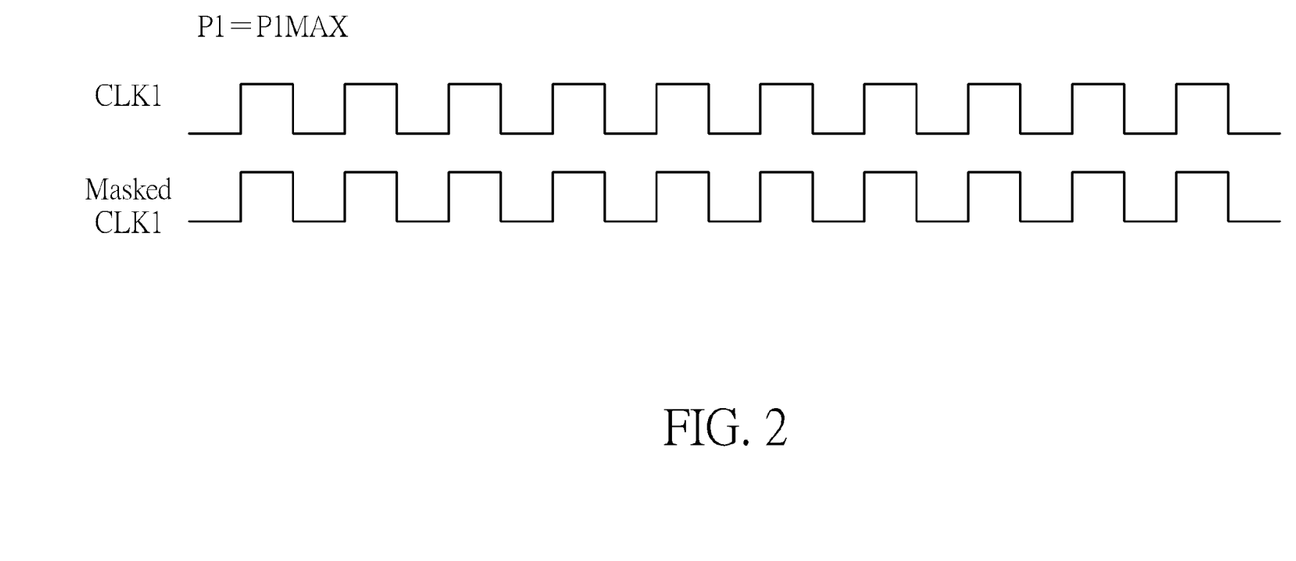
FIG. 2 is a schematic diagram of related signals of the electronic system shown in FIG. 1.

Please refer to FIG. 2, which is a schematic diagram of related signals of the electronic system 10. In FIG. 2, the function module IP1 operates in a full-active state and the performance P1 becomes P1MAX. According to the performance information signal PI1 and the performance determining unit 104 determines the mask ratio MR1 to be 0 because the function module IP1 needs to operate in full-speed. According to the mask ratio signal MRS, the clock mask unit 106 generates the mask signal MAS to instruct the clock managing unit 108 not to adjust the clock signal CLK1. As shown in FIG. 2, the clock signal CLK1 does not change. In an example, the clock signal CLK1 is the source clock signal SCLK. That is, the clock managing unit 108 masks the clock pulses in the source clock signal SCLK according to the mask ratios MR1-MR3, to generate the clock signals CLK1-CLK3. In another example, the clock managing unit 108 uses the source clock signal SCLK to generate the clock signals CLK1-CLK3 and adjusts the clock signals CLK1-CLK3 according to the mask ratios MR1-MR3.

Figure 3:
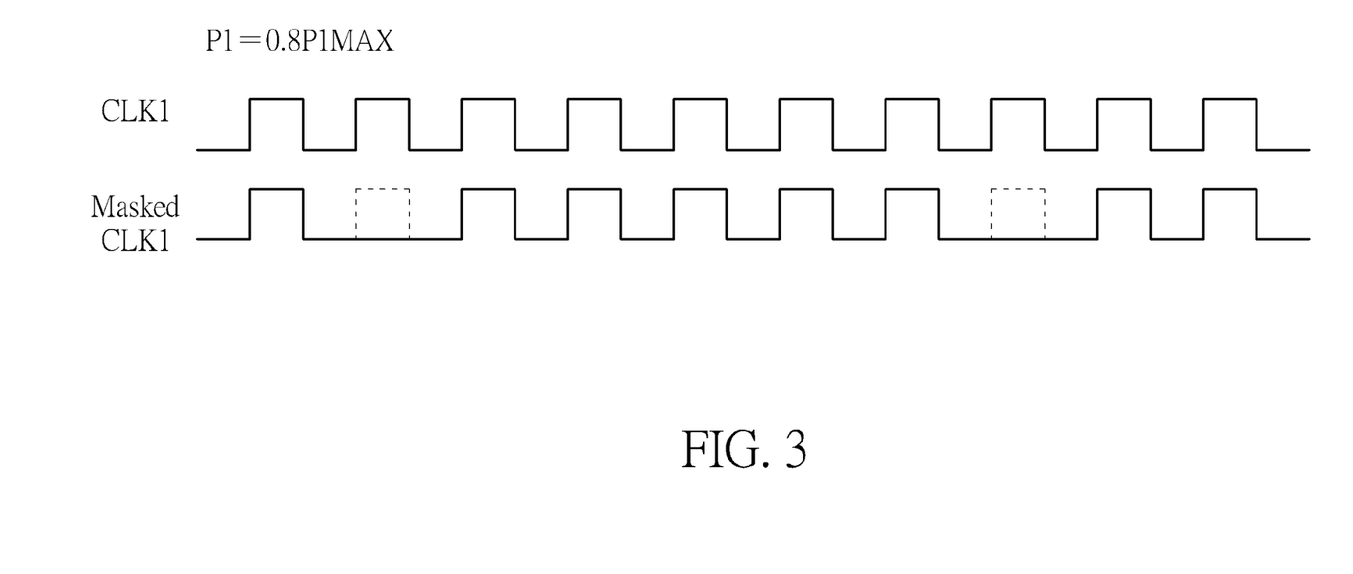
FIG. 3 is a schematic diagram of related signals of the electronic system shown in FIG. 1.

Please refer to FIG. 3, which is a schematic diagram of related signals of the electronic system 10. In FIG. 3, the function module IP1 enters a partial active state and the performance P1 of the function module IP1 becomes 0.8 P1MAX. For example, the function module IP1 may provide multiple functions when operating in the full active state. According to different operating conditions, part of the functions provided by the function module IP1 may be disabled and the performance of the function module IP1 decreases. Since the performance of the function module IP1 drops 20%, the power consumption of the function module IP1 would be wasted if the frequency FCLK1 of the clock signal CLK1 remains the same. Thus, the performance determining unit 104 determines the mask ratio MR to be 20% according to the performance information signal PI1. The clock mask unit 106 generates the mask signal MAS to instruct the clock managing unit 108 to reduce 20% of the number of the clock pulses in the clock signal CLK1. As shown in FIG. 3, the second clock pulse and the eighth clock pulse among the 10 contiguous clock pulses in the clock signal CLK1 are masked. As a result, the frequency FCLK1 is reduced with the performance P1 of the function module IP1. The power consumption of the electronic system 10 is also decreased with the performance of the function module IP1, therefore.

Note that, the clock mask unit 106 randomly selects the clock pulses to be masked in FIG. 3. As long as the number of the clock pulses in the clock signal CLK1 is reduced 20%, the masked clock pulses may be any clock pulse in the clock signal CLK1. For example, the masked clock pulses in another set of 10 contiguous clock pulses may be the first and fourth clock pulses among the 10 contiguous clock pulses in the clock signal CLK1.

Figure 4:
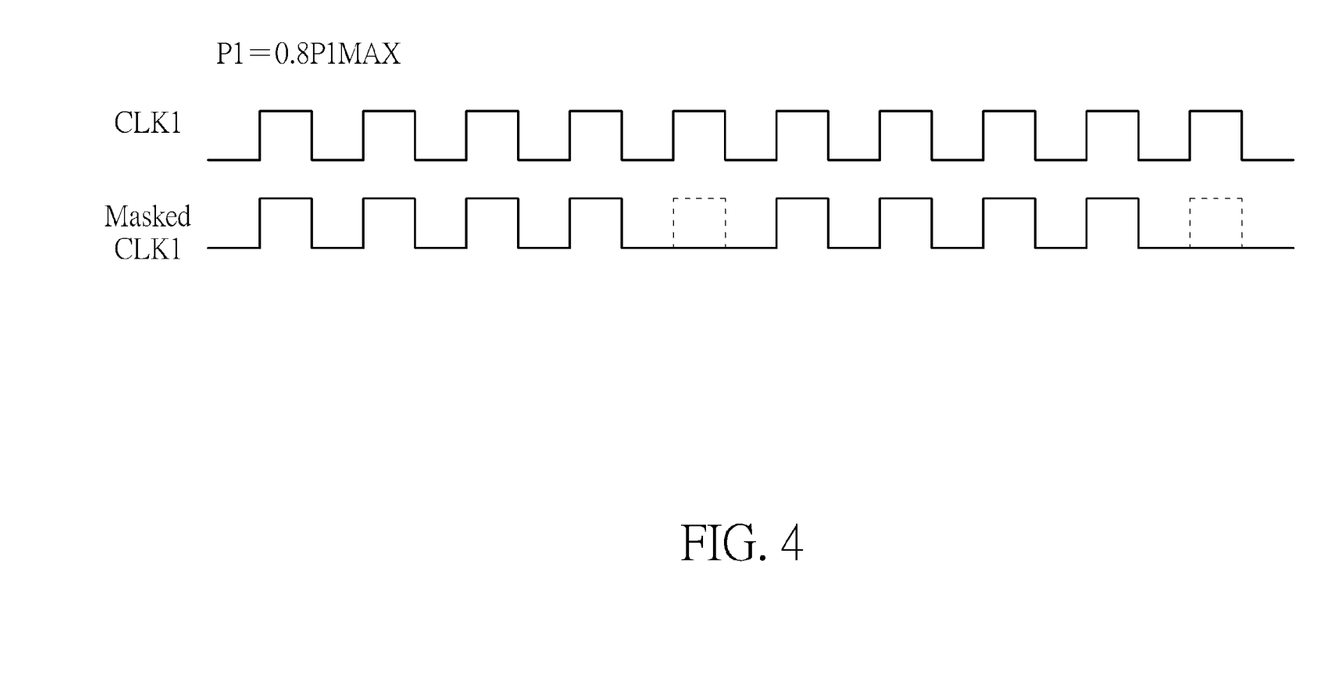
FIG. 4 is a schematic diagram of related signals of the electronic system shown in FIG. 1.

In an example, the clock mask unit 106 may instruct the clock managing unit 108 to periodically mask the clock pulses in the clock signals CLK1-CLK3 according to the mask ratios MR1-MR3 indicated by the mask ration signal MRS. Please refer to FIG. 4, which is a schematic diagram of related signals of the electronic system 10 shown in FIG. 1. Similar to the conditions in FIG. 3, the function module IP1 enters the partial active state in FIG. 4. The performance determining unit 104 determines that the performance P1 is equal to 0.8*P1MAX and decides the mask ratio MR1 is 0.2. The clock mask unit 106 generates the mask signal MAS to instruct the clock managing unit 108 to reduce 20% of the number of the clock pulses in the clock signal CLK1. In this example, the clock mask unit 106 instructs the clock managing unit 108 to sequentially mask 1 clock pulse every 5 clock pulses in the clock signal CLK1. As shown in FIG. 4, the fifth clock pulse and the tenth clock pulse among the 10 contiguous clock pulses are masked by the clock managing unit 108. As a result, the frequency FCLK1 is reduced with the performance P1 of the function module IP1. The power consumption of the electronic system 10 is also decreased with the performance P1, therefore.

Note that, the pattern of the sequence of the masked clock pulses in the clock signal CLK1 can be appropriately altered according to different mask ratios and is not limited by FIG. 4.

Figure 5:
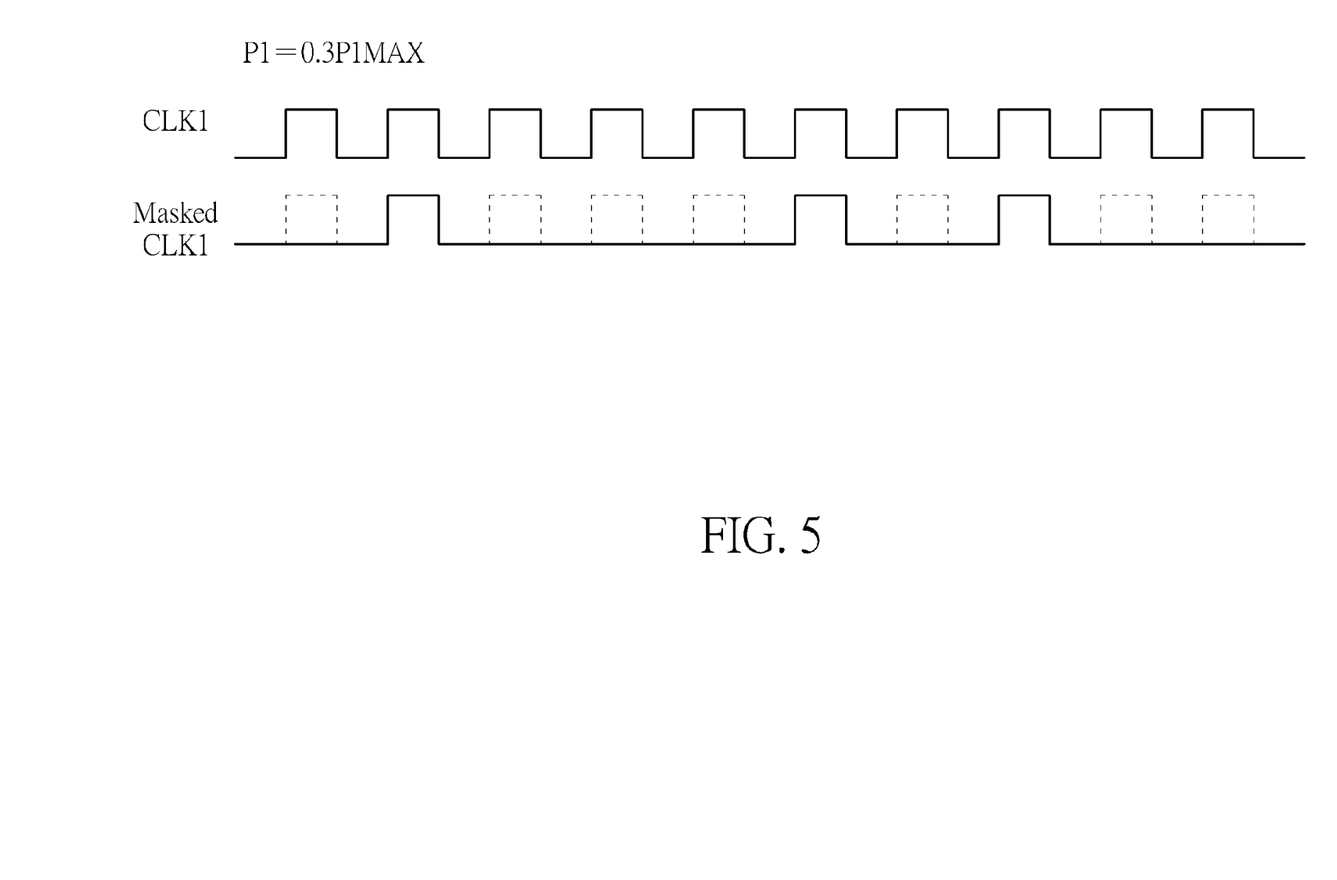
FIG. 5 is a schematic diagram of related signals of the electronic system shown in FIG. 1.

Please refer to FIG. 5, which is a schematic diagram of related signals of the electronic system 10. In FIG. 5, the performance P1 becomes 0.3*P1MAX and the performance determining unit 104 determines the mask ratio MR1 to be 0.7. The clock mask unit 106 generates the mask signal MAS to instruct the clock managing unit 108 to reduce 70% of the number of the clock pulses in the clock signal CLK1. As shown in FIG. 5, the clock mask unit 106 instructs the clock managing unit 108 to mask the first, third, fourth, fifth, seventh, ninth, and tenth clock pulses among the 10 contiguous clock pulses via the mask signal MAS. As a result, the frequency FOLK is reduced with the performance P1 of the function module IP1.

Note that, the performance information of the function modules IP1-IP3 may be provided when the function modules IP1-IP3 is operating. In another example, the performance information of the function modules IP1-IP3 may be provided when the function modules IP1-IP3 stops operating.

Figure 6:
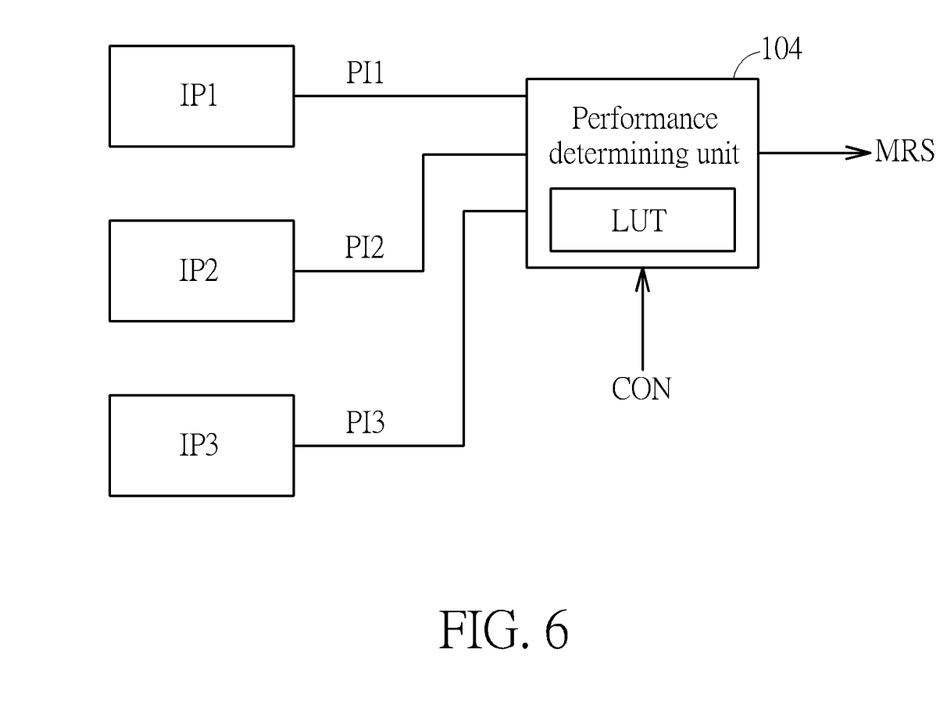
FIG. 6 is a schematic diagram of an implementation of the performance determining unit shown in FIG. 1.

According to different application and design concepts, the method of the performance determining unit 104 determining the performances P1-P3 requirements of the function modules IP1-IP3 may be various. Please refer to FIG. 6, which is a schematic diagram of an implementation of the performance determining unit 104 shown in FIG. 1. As shown in FIG. 6, a lookup table LUT is built in the performance determining unit 104. In this example, the performance determining unit 104 determines function modes of the function modules IP1-IP3 (e.g. the functions provided by the function modules IP1-IP3) according to the performance information signals PI1-PI3 and determines the performances P1-P3 requirements via searching the index corresponding to the current functions modes of the function modules IP1-IP3 in the lookup table LUT. In an example, the lookup table LUT is predefined in the performance determining unit 104. In another example, the lookup table LUT may be modified by a control signal CON, wherein the control signal CON may be a signal from a software programming interface or a hardware control parameter.

Note that, the function modules IP1-IP3 may transmit signals to the clock managing unit 108 to indicate the operation statuses of the function modules IP1-IP3, and the clock managing unit 108 adjusts the clock signals CLK1, CLK2, and CLK3 according to the operation statuses indicated in the signals from the function modules IP1-IP3 to the clock managing unit 108. In an example, the function modules IP1-IP3 transmit idle signals IS1-IS3 (not shown in FIG. 1) to the clock managing unit 108, respectively, to indicate the clock managing unit 108 that whether the function modules IP1-IP3 enter the idle status and to make clock managing unit 108 accordingly adjusts the frequencies FCLK1-FCLK3 of the clock signals CLK1-CLK3.

Figure 7:
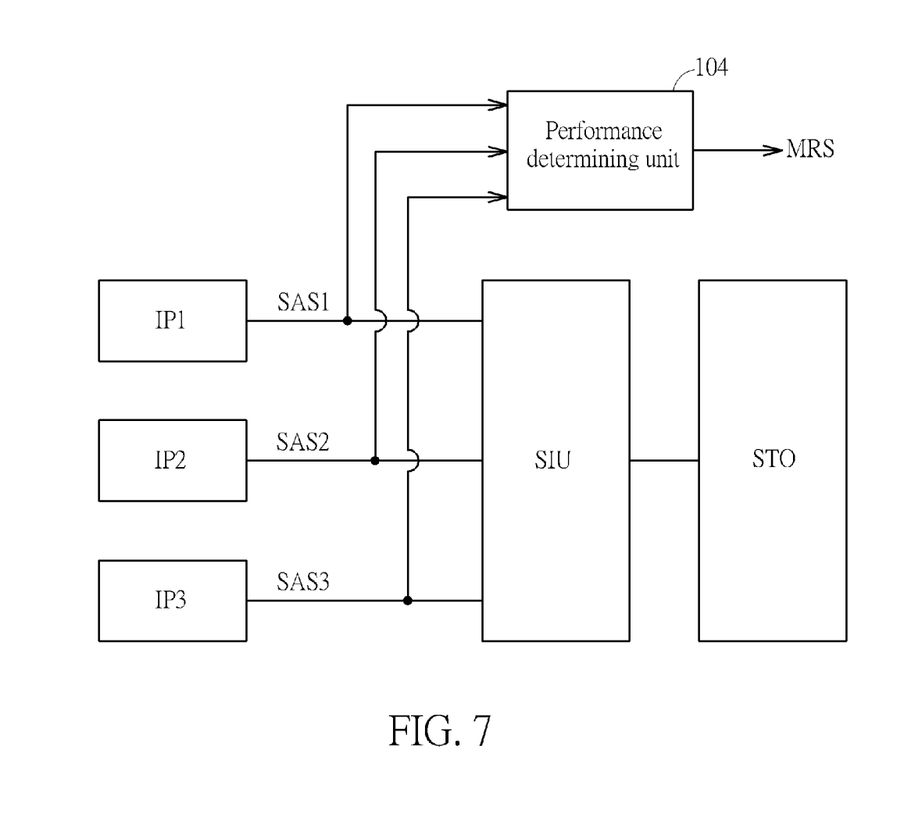
FIG. 7 is a schematic diagram of an implementation of the performance determining unit shown in FIG. 1.

Please refer to FIG. 7, which is a schematic diagram of an implementation of the performance determining unit 104 shown in FIG. 1. In FIG. 7, the function modules IP1-IP3 transmit storage access signals SAS1-SAS3 to a storage interface unit SIU (not shown in FIG. 1), to access data from a storage unit STO (e.g. a cache, a memory, or a hard disk) (not shown in FIG. 1). The performance determining unit 104 acquires the storage access signals SAS1-SAS3 as the performance information signals PI1-PI3 shown in FIG. 1 and determines the performances P1-P3 requirements according to the storage access signals SAS1-SAS3. For example, the performance determining unit 104 calculates the histograms of the data rate of the data accessed (e.g. transmitted and received) by the function modules IP1-IP3 and accordingly determines the performances P1-P3 requirements.

Figure 8:
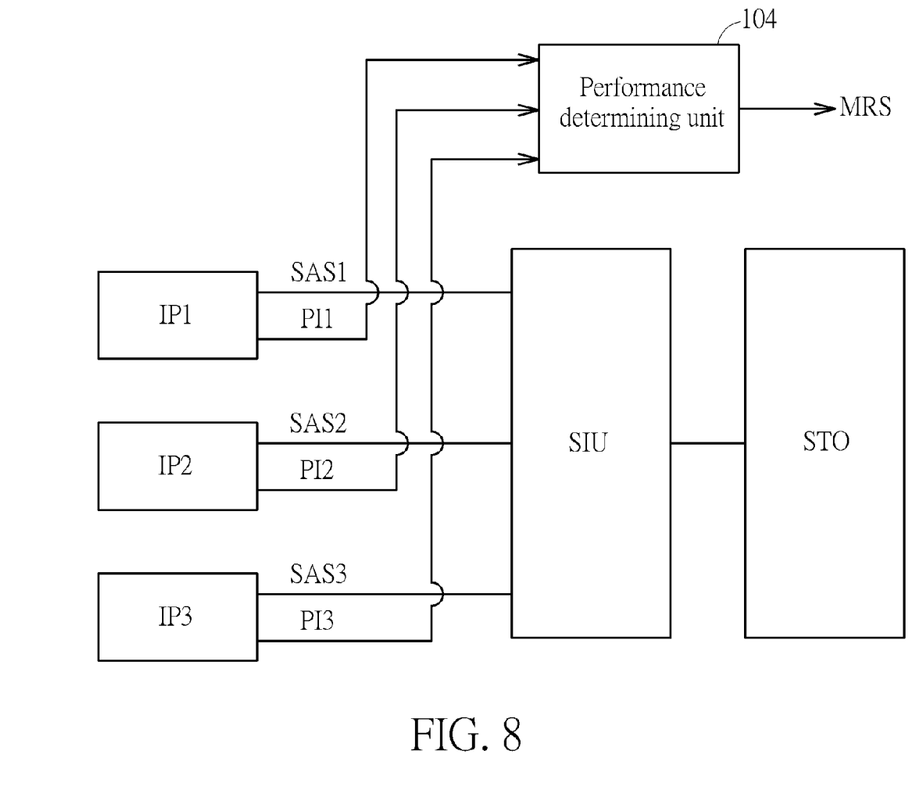
FIG. 8 is a schematic diagram of an implementation of the performance determining unit shown in FIG. 1.

Please refer to FIG. 8, which is a schematic diagram of an implementation of the performance determining unit 104 shown in FIG. 1. The performance determining unit 104 shown in FIG. 8 is similar to that shown in FIG. 7, thus the signals and the components with similar functions use the same symbols. Different from FIG. 7, the function modules IP1-IP3 estimates the performances P1-P3 requirements when generating the storage access signals SAS1-SAS3 and accordingly generates the performance information signals PI1-PI3. Under such a condition, the performance determining unit 104 generates the mask ratio signal MRS according to the performance information signals PI1-PI3 related to the data rate of the data accessed by the function modules IP1-IP3.

Figure 9:
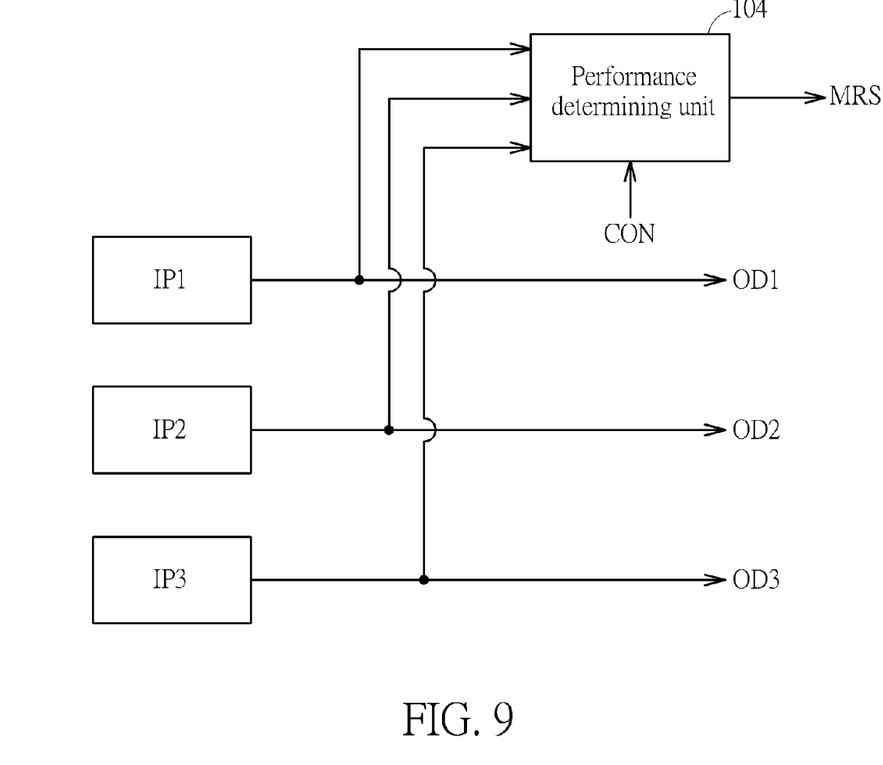
FIG. 9 is a schematic diagram of an implementation of the performance determining unit shown in FIG. 1.

Please refer to FIG. 9, which is a schematic diagram of an implementation of the performance determining unit 104 shown in FIG. 1. In this example, the performance determining unit 104 determines the performances P1-P3 requirements according to output data OD1-OD3 of the function modules IP1-IP3. That is, the performance determining unit 104 acquires the output data OD1-OD3 of the function modules IP1-IP3 as the performance information signals PI1-PI3 shown in FIG. 1. In an example, the performance determining unit 104 acquires the output data rates of the function modules IP1-IP3 according to the output data OD1-OD3, to determine the performances P1-P3 requirements of the function modules IP1-IP3 and generates the mask ratio signal MRS according to the performances P1-P3 requirements and the control signal CON. Via tracking the output data rates of the function modules IP1-IP3, the performance determining unit 104 acknowledges the variations of the performances P1-P3 requirements and changes the mask ratio signal MRS to adjust the frequencies of the clock signal CLK1-CLK3. The power consumption of the electronic system 10 is therefore reduced.

Figure 10:
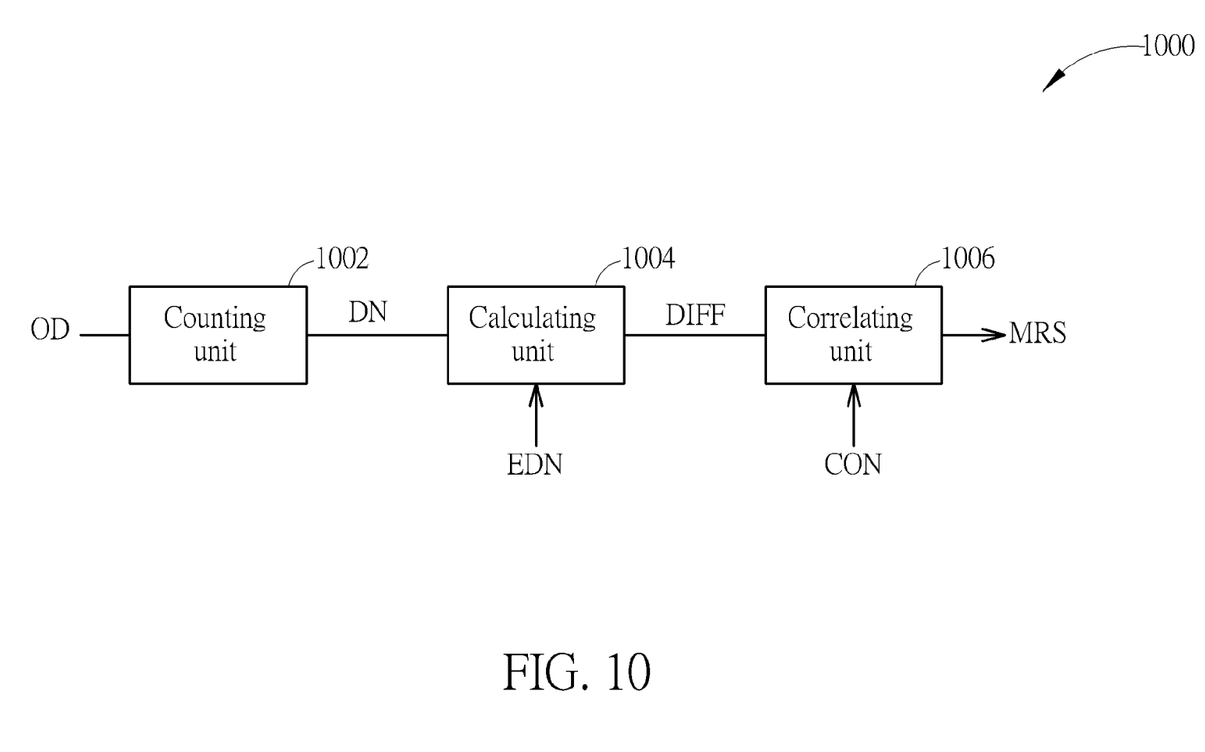
FIG. 10 is a schematic diagram of an implementation of the performance determining unit shown in FIG. 9.

Please refer to FIG. 10, which is a schematic diagram of a performance determining unit 1000 that is an implementation of the performance determining unit 104 shown in FIG. 9. In FIG. 10, the performance determining unit 1000 comprises a counting unit 1002, calculating unit 1004, and a correlating unit 1006. The counting unit 1002 receives output data OD (e.g. the output data OD1-OD3 shown in FIG. 9) and counts the data number DN in a fixed time window. Next, the calculating unit 1004 calculates a difference DIFF between the data number DN and an expected data number EDN and the correlating unit 1006 generates the mask ratio signal MRS according to the difference DIFF.

Note that, the relation between the mask ratio signal MRS and the difference DIFF is adjusted by the control signal CON.

According to different applications and design concepts, those with ordinary skill in the art may observe appropriate alternations and modifications. In an example, the clock mask unit 104 directly adjusts the clock generating unit 102 according to the mask ratio signal MRS. For example, the clock mask unit 104 may control the clock generating unit 102 to decrease the frequency FSCLK of the source clock signal SCLK by 10% when the mask ratio MR1 is 0.1 and the clock managing unit 108 outputs the source clock signal SCLK as the clock signal CLK1. In another example, the clock managing unit 108 simultaneously adjusts the frequency and the voltage level of the source clock signal SCLK when generating the clock signals CLK1-CLK3.

Figure 11:
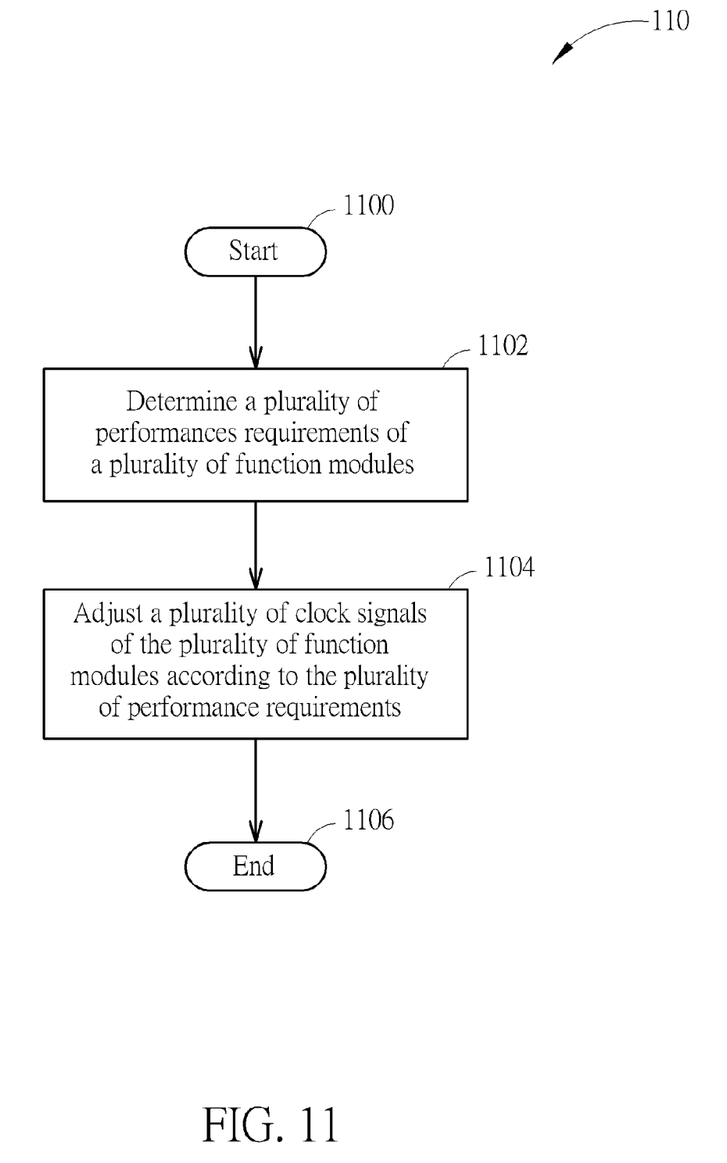
FIG. 11 is a flowchart of a process according to an implementation of the present invention.

The process of the clock management module 100 adjusting the clock signals CLK1-CLK3 according to the performances P1-P3 can be summarized into a clock managing method 110 shown in FIG. 11. The clock managing method 110 an electronic product such as a smart phone, a notebook computer, a tablet, or a smart television, and comprises the following steps:

Step 1100: Start.

Step 1102: Determine a plurality of performances requirements of a plurality of function modules.

Step 1104: Adjust a plurality of clock signals of the plurality of function modules according to the plurality of performance requirements.

Step 1106: End.

According to the clock managing method 110, the performance requirement of each of a plurality of function modules are determined. In an example, the performance requirement of the function module is total data rates of data inputted and outputted by the function module. In another example, the performance requirement of the function module is the module status provided by the function module. In still another example, the performance requirement of the function module is a data rate of data transmitted or received from a storage unit. After determining the plurality of performances requirements of the plurality of function modules, the clock signals of the function modules are accordingly adjusted. For example, the plurality of clock signals may be adjusted by masking a part of clock pulses in the clock signals according to the performances requirements of the plurality function modules. When the performance of function module drops, the number of masked clock pulses in the corresponding clock signal. That is, the frequency of the clock signal is proportional to the performance of the corresponding function module. By adjusting the plurality of clock signals according to the plurality of performances requirements of the plurality of function modules, the power consumption of the plurality of function modules is reduced.

Note that, the clock pulses may be masked periodically or randomly. The detailed operations of masking clock pulses of the clock signal according to the performance of the corresponding function module can be referred to FIGS. 2-5, and are not narrated herein for brevity. In addition, the method of determining the plurality of performances of the plurality of function modules may be various. In an example, the performance is the data outputted by the function module. Under such a condition, the performance of the function module can be acquired by counting a data number of the data outputted by the plurality of function modules in a fixed time window, calculating a difference between the data number and an expected data number, and determining the performance according the difference and a control signal, wherein the control signal may be a signal from a software programming interface or a hardware control parameter.

The electronic system of the above examples adjusts the clock signal received by the function modules providing independent functions according to the performances (e.g. the bandwidths or the throughputs) of the function modules. Because the clock signal is adjusted with the change of the performances of the function modules, the power consumption of the electronic system can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic system, comprising:
   a plurality of function modules, wherein each of the plurality of function modules operates according to one of a plurality of clock signals and provides one of a plurality of performance requirements according to a status of each of the plurality of function modules; and
   a clock management module, for generating the plurality of clock signals according to the plurality of performance requirements of the plurality of function modules, comprising:
      a clock generating unit, for generating a source clock signal;
      a performance determining unit, for determining a plurality of mask ratios of generating the plurality of clock signals according to the plurality of performance requirements of the plurality of function modules;
      a clock mask unit, for generating a mask signal according to the plurality of mask ratios; and
      a clock managing unit, for generating the clock signals according to the source clock signal and adjusting frequencies of the plurality of clock signals according to the mask signal;
   wherein the plurality of performance requirements are data outputted by the plurality of function modules and the performance determining unit comprises:
      a counting unit, for counting a data number of the data outputted by the plurality of function modules in a fixed time window;
      a calculating unit, for calculating a difference between the data number and an expected data number; and
      a correlating unit, for determining the plurality of mask ratios according the difference and a control signal;
   wherein a relationship between the difference and each of the plurality of mask ratios is adjusted by the control signal.

2. The electronic system of claim 1, wherein the plurality of performance requirements are data rates of data inputted and outputted by the plurality of function modules.

3. The electronic system of claim 1, wherein the plurality of performance requirements are the functions provided by the plurality of function modules.

4. The electronic system of claim 1, wherein the plurality of performance requirements are the data rates of data transmitted or received from a storage unit in the electronic system.

5. The electronic system of claim 1, wherein the clock managing unit adjusts the frequencies of the plurality of clock signals by masking clock pulses in the plurality of clock signals according to the mask signal.

6. The electronic system of claim 5, wherein the masked clock pulses are periodical clock pulses.

7. A clock managing method, comprising:
   providing, by a plurality of function modules, a plurality of performance requirements of the plurality of function modules according to a status of each of the plurality of function modules; and
   adjusting a plurality of clock signals of the plurality of function modules according to the plurality of performance requirements;
   wherein the step of adjusting the plurality of clock signals of the plurality of function modules according to the plurality of performance requirements comprises:
      masking clock pulses in the plurality of clock signals according to the plurality of performance requirements;
   wherein the plurality of performance requirements are data outputted by the plurality of function modules and the step of providing the plurality of performance requirements of the plurality of function modules comprises:
      counting a data number of the data outputted by the plurality of function modules in a fixed time window;
      calculating a difference between the data number and an expected data number; and
      providing the plurality of performance requirements according the difference and a control signal;
   wherein a relationship between the difference and each of the plurality of mask ratios is adjusted by the control signal.

8. The clock managing method of claim 7, wherein the plurality of performance requirements are data rates of data inputted and outputted by the plurality of function modules.

9. The clock managing method of claim 7, wherein the plurality of performance requirements are the functions provided by the plurality of function modules.

10. The clock managing method of claim 7, wherein the plurality of performance requirements are the data rates of data transmitted or received from a storage unit in the electronic system.

11. The clock managing method of claim 7, wherein the masked clock pulses are periodical clock pulses.

* * * * *